(12) United States Patent
Chen et al.

(10) Patent No.: US 10,769,374 B1
(45) Date of Patent: Sep. 8, 2020

(54) ANSWER SELECTION METHOD FOR QUESTION ANSWERING SYSTEM AND THE SYSTEM

(71) Applicant: Honghui Chen, Changsha (CN)

(72) Inventors: Honghui Chen, Changsha (CN); Taihua Shao, Changsha (CN); Fei Cai, Changsha (CN); Danyang Jiang, Changsha (CN); Junxian Liu, Changsha (CN); Aimin Luo, Changsha (CN); Tao Chen, Changsha (CN); Zhen Shu, Changsha (CN)

(73) Assignee: Honghui Chen, Changsha, Hunan (CN)

( * ) Notice: Subject to any disclaimer, the term of this patent is extended or adjusted under 35 U.S.C. 154(b) by 0 days.

(21) Appl. No.: 16/831,552

(22) Filed: Mar. 26, 2020

(30) Foreign Application Priority Data

Apr. 24, 2019 (CN) .......................... 2019 1 0332100

(51) Int. Cl.
*G06F 40/00* (2020.01)
*G06F 40/253* (2020.01)
(Continued)

(52) U.S. Cl.
CPC .......... *G06F 40/253* (2020.01); *G06F 17/147* (2013.01); *G06F 17/16* (2013.01);
(Continued)

(58) Field of Classification Search
CPC . G06F 16/3347; G06F 16/3329; G06N 3/006; G06N 3/0445
See application file for complete search history.

(56) References Cited

U.S. PATENT DOCUMENTS 6,038,533 A * 3/2000 Buchsbaum .......... G10L 13/027
704/255
10,133,860 B2 * 11/2018 Das ........................ G06F 21/45
(Continued)

OTHER PUBLICATIONS

Kumar, et al., "Ask Me Anything: Dynamic Memory Networks for Natural Language Processing", Proceedings of the 33 rd International Conference on Machine Learning, Feb. 2016. JMLR: W&CP, vol. 48,10 pages. (Year: 2016).*

(Continued)

*Primary Examiner* — Edgar X Guerra-Erazo
(74) *Attorney, Agent, or Firm* — Dragon Sun Law Firm, PC; Jinggao Li, Esq.

(57) ABSTRACT

Disclosed are an answer selection method for a question answering system. With the method and system, a sentence distributed representation of a question and an answer is generated by adopting a hierarchical length-adaptive neural network structure with a purpose of extracting high-quality sentence features by using different neural feature extractors according to a length of an input sentence. First, one word distributed representation is generated for each word in the input sentence by connecting one fixed word embedding and one finely-adjusted word embedding. Next, a BiLSTM-based feature extractor is used for a short sentence and a Transformer-based feature extractor is used for a long sentence. Finally, a sentence vector representation for measuring a correlation between a question and a candidate answer is generated by using an attention pooling layer considering an interaction between a question sentence and an answer sentence.

10 Claims, 3 Drawing Sheets

(51) Int. Cl.
  *G06F 17/16* (2006.01)
  *G06N 3/08* (2006.01)
  *G06N 5/04* (2006.01)
  *G06N 3/04* (2006.01)
  *G06F 17/14* (2006.01)
(52) U.S. Cl.
  CPC .............. *G06N 3/049* (2013.01); *G06N 3/08* (2013.01); *G06N 5/04* (2013.01)

(56) References Cited

U.S. PATENT DOCUMENTS

2016/0078217 A1* 3/2016 Das .................. G06F 21/45 726/18
2016/0350288 A1* 12/2016 Wick ................ G06F 40/242
2017/0011289 A1* 1/2017 Gao ................. G06F 40/268

OTHER PUBLICATIONS

T. Shao, X. Kui, P. Zhang and H. Chen, "Collaborative Learning for Answer Selection in Question Answering," in IEEE Access, vol. 7, pp. 7337-7347, 2019.*

Xiong, C. Z., & Su, M. (2019). IARNN-Based Semantic-Containing Double-Level Embedding Bi-LSTM for Question-and-Answer Matching. Computational intelligence and neuroscience, 2019.*

J. F. Lilian, K. Sundarakantham, H. Rajashree and S. M. Shalinie, "SSE: Semantic Sentence Embedding for learning user interactions," 2019 10th International Conference on Computing, Communication and Networking Technologies (ICCCNT), Kanpur, India, 2019.*

Yan, D., & Guo, S. (2019). Leveraging Contextual Sentences for Text Classification by Using a Neural Attention Model. Computational intelligence and neuroscience, 2019.*

* cited by examiner

ANSWER SELECTION METHOD FOR QUESTION ANSWERING SYSTEM AND THE SYSTEM

CROSS-REFERENCE TO RELATED APPLICATIONS

This application claims priority to and the benefit of CN 2019103321007, filed Apr. 24, 2019. The entire disclosure of the above-identified application is incorporated herein by reference.

Some references, which may include patents, patent applications, and various publications, are cited and discussed in the description of the present disclosure. The citation and/or discussion of such references is provided merely to clarify the description of the present disclosure and is not an admission that any such reference is "prior art" to the present disclosure described herein. All references cited and discussed in this specification are incorporated herein by reference in their entireties and to the same extent as if each reference was individually incorporated by reference.

TECHNICAL FIELD

The present disclosure relates to the technical field of question answering systems, and in particular to an answer selection method for a question answering system and a system thereof.

BACKGROUND

Answer selection in a computerized question answering system refers to selecting a correct answer to a question from some candidate answers. According to an existing method, it is mainly attempted to generate high-quality sentence distributed representations for questions and candidate answers, and these distributed representations will be then used to measure a correlation between the candidate answers and the question and further select and return a candidate answer with the highest correlation as the correct answer. The existing method is performed mostly through a Recurrent Neural Network (RNN) to achieve a good performance However, the inventors have found during use that the RNN processes all sentences of question and answer by using a same feature extractor regardless of sentence lengths. A long-term dependency problem often occurs during use of these methods, which means that it is very difficult for the network to learn a dependency relationship between far-spaced words. Because a long-distance interaction between words of these sentences cannot be completely captured, the quality is very low at the time of a long sentence distributed representation, leading to loss of global information.

Therefore, a heretofore unaddressed need exists in the art to address the aforementioned deficiencies and inadequacies.

SUMMARY

In view of this, the present disclosure provides an answer selection method for a question answering system and a system thereof to solve a problem that a sentence length is neglected in the answer selection method of the existing question answering system.

Based on the above objective, the present disclosure provides an answer selection method for a question answering system, including the following blocks.

At block A, a question sentence and an answer sentence input by a user are received, a first word vector of each word in each sentence is obtained by using a word embedding model obtained through pre-training, and a combined word vector is obtained through calculation in combination with a second word vector obtained by performing fine adjustment for the word embedding model in a network training process.

At block B, a final vector of each word in the sentence is obtained by selecting a valid feature from the connected word vectors.

At block C, when a sentence length is greater or smaller than a preset sentence length threshold, the sentence is processed by adopting a different feature extractor according to the preset sentence length threshold so as to generate a fitted sentence matrix representation containing contextual information.

At block D, an attention similarity of the question sentence and the answer sentence is obtained by an attention pooling layer according to the sentence matrix containing contextual information obtained at block C, and a length-adaptive distributed representation is performed for the question sentence and the answer sentence by, respectively extracting a maximum feature at each dimension of row and column of a similarity matrix so as to generate a distributed vector representation for the question sentence and the answer sentence, respectively.

At block E, a correlation of each answer sentence relative to the question sentence is obtained by measuring a cosine similarity between the distributed vector representations of the question sentence and the answer sentence, and the answer sentences are sorted according to the correlation.

Preferably, block A includes the following blocks.

At block A1, the input question sentence and the input answer sentence are both defined as a sentence s with a length being L, and a word embedding model of the t-th word $W_t$, in the sentence s is obtained through pre-training in a corpus to search for a first word vector $r_{W_t}^{fr}$ corresponding to the word therefrom.

At block A2, fine adjustment is performed for parameters of the pre-trained word embedding model in the network training process to adapt the model to a current data set, an updated word embedding model is obtained, and a second word vector $r_{W_t}^{ft}$, corresponding to the word is obtained therefrom to calculate a combined word vector as $r_{W_t}^{C} = r_{W_t}^{fr} \| r_{W_t}^{ft}$.

Preferably, block B includes the following blocks.

At block B1, a hidden layer is deployed and the final vector representation of each word in the sentence is obtained by selecting a valid feature from the connected word vectors based on $$r_{W_t} = \tanh(W_h \cdot r_{W_t}^{C} + b_h).$$

In the above formula, h refers to a word representation with a memory in a particular direction, $W_h \in \mathbb{z,21}^{D \times D}$ and $b_h \in \mathbb{R}^{D \times 1}$ both refer to hidden layer parameters, $\mathbb{R}$ refers to a set of real numbers, $\mathbb{R}^{D \times D}$ refers to a real number matrix with dimensions being D×D, $\mathbb{R}^{D \times 1}$ refers to a real number matrix with dimensions being D×1, and D refers to a dimension of $r_{W_t}$.

At block B2, a sentence distributed matrix representation containing no contextual information is obtained based on $R_s = (r_{W_1}, r_{W_2}, \ldots r_{W_L})$ by performing blocks A1, A2 and B1 for all words in all sentences.

Preferably, at block C, two feature extractors, i.e., a BiLSTM-based feature extractor and a Transformer-based feature extractor, are deployed for each input sentence, and the fitted sentence distributed matrix representation is generated by performing addition for the sentence distributed matrixes generated with two feature extractors.

Preferably, at block C, each feature extractor is defined to have one binary activation parameter, and the binary activation parameters are set as follows:

$$\begin{cases} flag_{lstm} = 1 \text{ and } flag_{tsfm} = 0, & (L \leq L_{threshold}) \\ flag_{lstm} = 0 \text{ and } flag_{tsfm} = 1, & (L > L_{threshold}) \end{cases}$$

In the above formula, $flag_{lstm}$ refers to the binary activation parameter of the BiLSTM-based feature extractor, $flag_{tsfm}$ refers to the binary activation parameter of the Transformer-based feature extractor, and $L_{threshold}$ refers to a sentence length threshold.

The inputs of different sentences based on the feature extractors are as follows:

$$R_s^{lstm} = R_s \cdot flag_{lstm}$$

$$R_s^{tsfm} = R_s \cdot flag_{tsfm}$$

In the above formula, $R_s^{lstm}$ refers to an input of the BiLSTM-based feature extractor, and $R_s^{tsfm}$ refers to an input of the Transformer-based feature extractor.

Preferably, at block C, when the sentence length L is smaller than the threshold $L_{threshold}$, a specific operation formula of the t-th word in the sentence is as follows:

$$\begin{cases} f_t = sigmoid(W_f \cdot r_{w_t}^{lstm} + U_f \cdot h_{t-1} + b_f) \\ i_t = sigmoid(W_i \cdot r_{w_t}^{lstm} + U_i \cdot h_{t-1} + b_i) \\ \tilde{C}_t = \tanh(W_c \cdot r_{w_t}^{lstm} + U_c \cdot h_{t-1} + b_c) \\ C_t = f_t \cdot C_{t-1} + i_t \cdot \tilde{C}_t \\ o_t = sigmoid(W_o \cdot r_{w_t}^{lstm} + U_o \cdot h_{t-1} + b_o) \\ h_t = o_t \cdot \tanh(C_t) \\ r_{w_t}^{short} = \vec{h}_t \| \overleftarrow{h}_t \end{cases}$$

In the above formula, $r_{W_t}^{lstm}$ refers to a representation input of the t-th word, i, o and f refer to an input gate, an output gate and a forget gate in the BiLSTM, respectively,$\tilde{C}$ and C refer to a retained total memory and a memory retained for the current word, respectively, h refers to a word representation with a memory in a particular direction where its dimension is H, $\vec{h}$ and $\overleftarrow{h}$ refer to forward and backward word representations with memories respectively, and $W \in \mathbb{R}^{H \times D}$, $U \in \mathbb{R}^{H \times H}$ and $b \in \mathbb{R}^{H \times 1}$ are all network parameters.

The BiLSTM-based vector representations constitute a sentence matrix representation $R_s^{short}$ containing contextual information as follows:

$$R_s^{short} = (r_{W_1}^{short} r_{W_2}^{short} \ldots r_{W_L}^{short})$$

Preferably, at block C, when the sentence length L is greater than the threshold $L_{threshold}$, feature extraction is performed for the sentence based on the following calculation formula:

$$\begin{cases} f(R_s^{tsfm})_{a_i} = O_{a_i}^T \cdot \tanh(W_{a_i} \cdot R_s^{tsfm} + U_{a_i} \cdot R_s^{tsfm}) \\ R_s^{a_i} = R_s^{tsfm} \cdot softmax\left(\dfrac{f(R_s^{tsfm})_{a_i}^T}{\sqrt{d_{R_s^{tsfm}}}}\right) \\ R_s^{long} = R_s^{a_1} \| R_s^{a_2} \| \ldots \| R_s^{a_n} = (r_{w_1}^{long} r_{w_2}^{long} \ldots r_{w_L}^{long}) \end{cases}$$

In the above formula, $f(R_s^{tsfm})_{a_i}$ refers to a self-attention similarity of the i-th self-attention mechanism in a multi-head self-attention mechanism of a Transformer neural network; $R_s^{a_i}$ refers to a sentence matrix representation effected by the i-th self-attention, O, W and U are self-attention parameters;$d_{R_s}^{tsfm}$ refers to a dimension of each word vector in the input sentence matrix representation, $\sqrt{d_{R_s}^{tsfm}}$ aims to compress a softmax function, and $R_s^{long}$ refers to a Transformer-based sentence matrix representation containing contextual information.

Preferably, at block D, the following operation formula is used for the question sentence and the answer sentence by the attention pooling layer:

$$\begin{cases} G = R_Q^T \cdot U \cdot R_A \\ v_q = R_Q \cdot softmax(ColumnMax(G)) \\ v_a = R_A \cdot softmax(RowMax(G)) \end{cases}$$

In the above formula, G refers to an attention similarity of a question and an answer, $R_Q$ refers to a sentence matrix representation containing contextual information for the question sentence, $R_A$ refers to a sentence matrix representation containing contextual information for the answer sentence, and U is an attention parameter; ColumnMax(*) and RowMax(*) are functions of taking maximum values of each column and each row of the matrix, respectively.

Preferably, at block E, the neural network is trained by minimizing a sorting loss of the following candidate answers so that the neural network reaches an optimal training stage as follows:

$$loss = \max\{0, m - \cos(v_q, v_a+) + \cos(v_q, v_a-)\}$$

In the above formula, m is a preset interval, $v_q$ refers to a distributed vector representation of the question sentence, $v_a$ refers to a distributed vector representation of the answer sentence,$a^+$ refers to a positive answer in a training instance, and $a^-$ refers to a negative answer in the training instance.

Based on the above method, the present disclosure further provides an answer selection system for a question answering system, including a client and a server, where the client is connected with the server through a wireless network.

The server includes the following modules.

In module A, a question sentence and an answer sentence input by a user are received, a first word vector of each word in each sentence is obtained by using a word embedding model obtained through pre-training, and a combined word vector is obtained through calculation in combination with a second word vector obtained by performing fine adjustment for the word embedding model in a network training process.

In module B, a final vector of each word in the sentence is obtained by selecting a valid feature from the connected word vectors.

In module C, when a sentence length is greater or smaller than a preset sentence length threshold, the sentence is processed by adopting a different feature extractor according to the preset sentence length threshold so as to generate a fitted sentence matrix representation containing contextual information.

In module D, an attention similarity of the question sentence and the answer sentence is obtained by an attention pooling layer according to the sentence matrix containing contextual information obtained at block C, and a length-adaptive distributed representation is performed for the question sentence and the answer sentence by extracting a maximum feature at each dimension of row and column of a similarity matrix respectively so as to generate a distributed vector representation for the question sentence and the answer sentence, respectively.

In module E, a correlation of each answer sentence relative to the question sentence is obtained by measuring a cosine similarity between the distributed vector representations of the question sentence and the answer sentence, and the answer sentences are sorted according to the correlation.

Module A includes the following units.

In unit A1, the input question sentence and the input answer sentence are both defined as a sentence s with a length being L, and a word embedding model of the t-th word $W_t$ in the sentence s is obtained through pre-training in a corpus to search for a first word vector $r_{W_t}^{fr}$ corresponding to the word therefrom.

In unit A2, fine adjustment is performed for parameters of the pre-trained word embedding model in the network training process to adapt the model s to a current data set, the updated word embedding model is obtained, and a second word vector $r_{W_t}^{ft}$ corresponding to the word is obtained therefrom to calculate a combined word vector as $r_{W_t}^{C} = r_{W_t}^{fr} \| r_{W_t}^{ft}$.

Module B includes the following units.

In unit B1, a hidden layer is deployed, and a final vector representation of each word in the sentence is obtained by selecting a valid feature from the connected word vectors based on $$r_{W_t} = \tanh(W_h \cdot r_{W_t}^{C} + b_h).$$

In the above formula, h refers to a word representation with a memory in a particular direction, $W_h \in \mathbb{R}^{D \times D}$ and $b_h \in \mathbb{R}^{D \times 1}$ both refer to hidden layer parameters, $\mathbb{R}$ refers to a set of real numbers, $\mathbb{R}^{D \times D}$ refers to a real number matrix with dimensions being D×D, $\mathbb{R}^{D \times 1}$ refers to a real number matrix with dimensions being D×1, and D refers to a dimension of $r_{W_t}$.

In unit B2, a sentence distributed matrix representation containing no contextual information is obtained based on $R_s = (r_{W_1} r_{W_2} \ldots r_{W_L})$ by performing blocks A1, A2 and B1 for all words in all sentences.

It can be seen from the above descriptions that the answer selection method for a question answering system according to the present disclosure adopts a hierarchical length-adaptive neural network structure to generate the sentence distributed representation of question and answer with a purpose of extracting high-quality sentence features by using different neural feature extractors according to a length of an input sentence. First, one word distributed representation is generated for each word in the input sentence by connecting one fixed word embedding and one finely-adjusted word embedding. Next, the BiLSTM-based feature extractor is used for a short sentence and the Transformer-based feature extractor is used for a long sentence. Finally, a sentence vector representation for measuring a correlation between a question and a candidate answer is generated by using an attention pooling layer considering an interaction between a question sentence and an answer sentence. Experimental results show that the answer selection model based on a length-adaptive neural network according to the present disclosure achieves a larger improvement in MAP and MRR than on the most advanced baseline.

BRIEF DESCRIPTION OF THE DRAWINGS

The accompanying drawings illustrate one or more embodiments of the present invention and, together with the written description, serve to explain the principles of the invention. Wherever possible, the same reference numbers are used throughout the drawings to refer to the same or like elements of an embodiment.

DETAILED DESCRIPTION OF THE EMBODIMENTS

Figure 1:
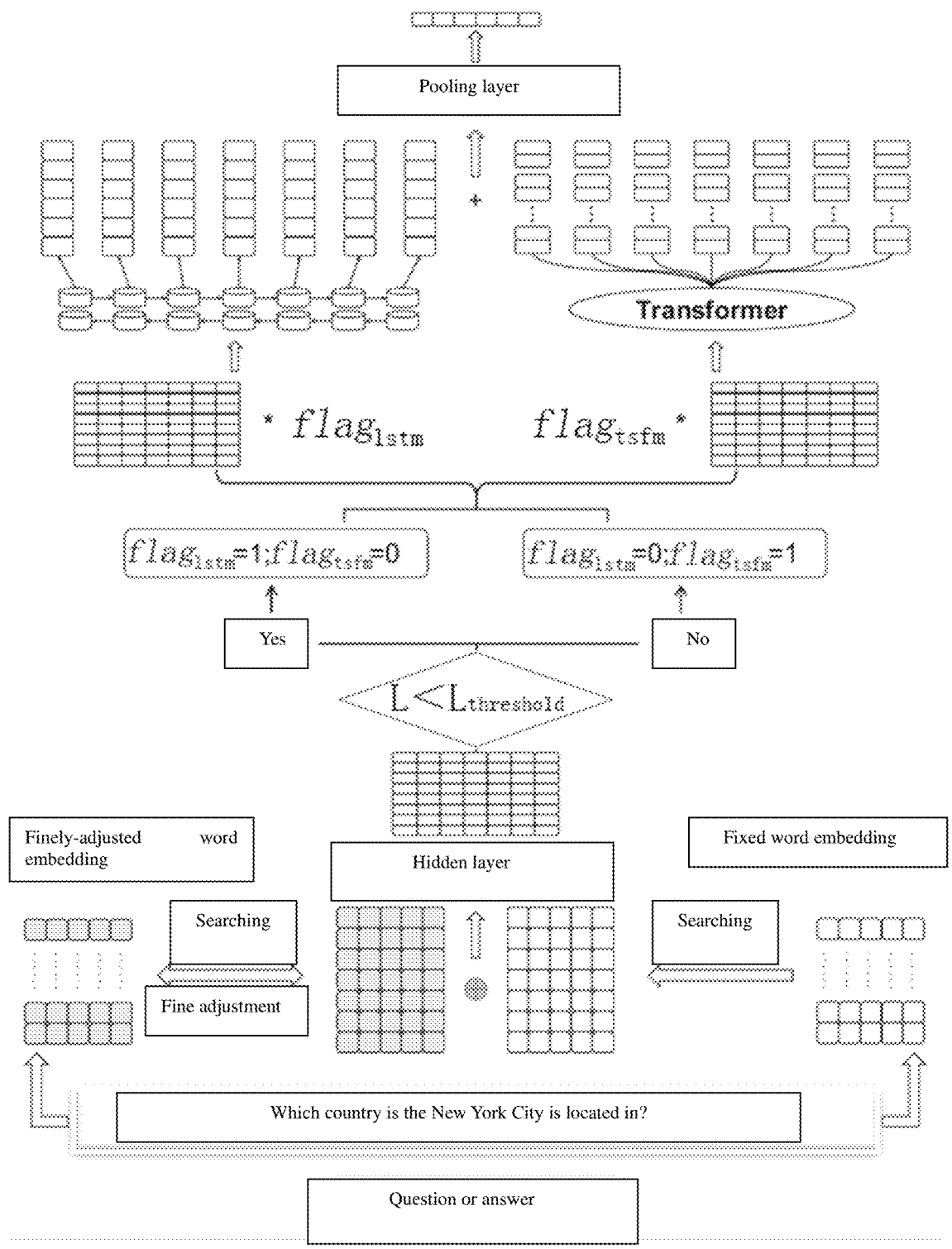
FIG. 1 is a flowchart illustrating an answer selection method according to an example of the present disclosure.
Figure 2:
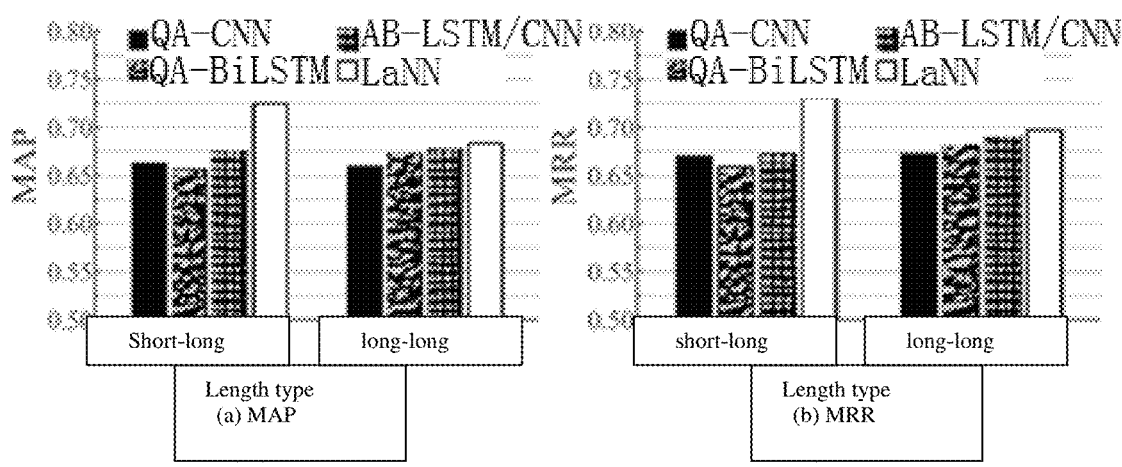
FIG. 2 is a schematic diagram illustrating performances of question-answer pairs with different lengths in MAP and MRR according to an example of the present disclosure.

To understand the objects, technical solutions and advantages of the present disclosure more clearly, the present disclosure will be further described in detail below in combination with specific examples and accompanying drawings.

An answer selection method for a question answering system includes the following blocks.

At block A, a question sentence and an answer sentence input by a user are received, a first word vector of each word in each sentence is obtained by using a word embedding model obtained through pre-training, and a combined word vector is obtained through calculation in combination with a second word vector obtained by performing fine adjustment for the word embedding model in a network training process.

At block B, a final vector of each word in the sentence is obtained by selecting a valid feature from the connected word vectors.

At block C, when a sentence length is greater or smaller than a preset sentence length threshold, the sentence is processed by adopting a different feature extractor according to the preset sentence length threshold to generate a fitted sentence matrix representation containing contextual information.

At block D, an attention similarity of the question sentence and the answer sentence is obtained by an attention pooling layer according to the sentence matrix containing contextual information obtained at block C, and a length-adaptive distributed representation is performed for the question sentence and the answer sentence by extracting a maximum feature at each dimension of row and column of a similarity matrix, respectively, so as to generate a distributed vector representation for the question sentence and the answer sentence, respectively.

At block E, a correlation of each answer sentence relative to the question sentence is obtained by measuring a cosine similarity between the distributed vector representations of the question sentence and the answer sentence, and the answer sentences are sorted according to the correlation.

Optionally, block A further includes the following blocks.

At block A1, the input question sentence and the input answer sentence are both defined as a sentence s with a length being L; to retain as many internal features of word as possible, a word embedding model of the t-th (1≤t≤L) word $W_t$ in the sentence s is first obtained through pre-training in a large-scale corpus to search for a first word vector $r_{W_t}^{fr}$ corresponding to the word therefrom.

At block A2, fine adjustment is performed for parameters of the pre-trained word embedding model in the network training process to adapt the model to a current data set, one updated word embedding model is obtained, and a second word vector $r_{W_t}^{ft}$ corresponding to the word is also obtained therefrom, so that a combined word vector $r_{W_t}^{C}$ is formed by connecting the first word vector and the second word vector obtained for each word based on the formula $r_{W_t}^{C} = r_{W_t}^{fr} \| r_{W_t}^{ft}$.

Optionally, block B includes the following blocks.

At block B1, a hidden layer is deployed and a final vector representation $r_{W_t}$ of each word in the sentence is obtained by selecting a valid feature from the connected word vectors based on the formula $r_{W_t} = \tanh(W_h \cdot r_{W_t}^{C} + b_h)$, where h refers to a word representation with a memory in a particular direction, $W_h \in \mathbb{R}^{D \times D}$ and $b_h \in \mathbb{R}^{D \times 1}$ both refer to hidden layer parameters, z,28 refers to a set of real numbers, $\mathbb{R}^{D \times D}$ refers to a real number matrix with dimensions being D×D, $\mathbb{R}^{D \times 1}$ refers to a real number matrix with dimensions being D×1, and D refers to a dimension of $r_{W_t}$.

At block B2, a sentence distributed matrix representation containing no contextual information is obtained based on $R_s = (r_{W_1} r_{W_2} \ldots r_{W_L})$ by performing blocks A1, A2 and B1 for all words in all sentences.

Optionally, all neural networks for answer selection in the prior art do not distinguish input sentences with different lengths, and the feature extraction of long sentences is easily affected by a long-term dependency problem, resulting in inability to capture global features of sentences. Therefore, at block C, two feature extractors, i.e., a BiLSTM-based feature extractor and a Transformer-based feature extractor, are deployed for each input sentence to process sentences with different lengths, and the fitted sentence distributed matrix representation is generated by performing addition for the sentence distributed matrixes generated with two feature extractors.

Optionally, at block C, each feature extractor is defined to have one binary activation parameter, and two parameters are both determined by the length L of the sentence. If the length of the sentence is greater than a preset sentence length threshold $L_{threshold}$, the sentence is considered as a long sentence. Further, the activation parameter of the Transformer-based feature extractor is set to 1, and the activation parameter of the BiLSTM-based feature extractor is set to 0. On the contrary, the activation parameter of the BiLSTM-based feature extractor is set to 1, and the activation parameter of the Transformer-based feature extractor is set to 0. The binary activation parameters are set as follows:

$$\begin{cases} flag_{lstm} = 1 \text{ and } flag_{tsfm} = 0, & (L \leq L_{threshold}) \\ flag_{lstm} = 0 \text{ and } flag_{tsfm} = 1, & (L > L_{threshold}) \end{cases}$$

In the above formula, $flag_{lstm}$ refers to the binary activation parameter of the BiLSTM-based feature extractor, $flag_{tsfm}$ refers to the binary activation parameter of the Transformer-based feature extractor, and $L_{threshold}$ refers to the sentence length threshold.

The activation parameter of each feature extractor and the sentence matrix representation containing no contextual information obtained at block B are multiplied as an input of each feature extractor, and the inputs of the sentences based on the feature extractors are as follows:

$$R_s^{lstm} = R_s \cdot flag_{lstm}$$

$$R_s^{tsfm} = R_s \cdot flag_{tsfm}$$

In the above formula, $R_s^{lstm}$ refers to an input of the BiLSTM-based feature extractor, and $R_s^{tsfm}$ refers to an input of the Transformer-based feature extractor. By activating a corresponding feature extractor, the length-adaptive neural network may perform different processing for input sentences with different lengths, so as to obtain the fitted sentence matrix representation containing contextual information. Further, the long-term dependency problem in the long sentence is also solved due to the use of the Transformer-based feature extractor.

Optionally, at block C, for a short sentence, that is, a sentence with a length smaller than the threshold $L_{threshold}$, a corresponding output of the Transformer-based feature extractor is an all-zero matrix, which is equivalent to performing feature extraction by only adopting the BiLSTM-based feature extractor. A specific operation formula for the representation input of the t-th word is as follows:

$$\begin{cases} f_t = sigmoid(W_f \cdot r_{w_t}^{lstm} + U_f \cdot h_{t-1} + b_f) \\ i_t = sigmoid(W_i \cdot r_{w_t}^{lstm} + U_i \cdot h_{t-1} + b_i) \\ \tilde{C}_t = \tanh(W_c \cdot r_{w_t}^{lstm} + U_c \cdot h_{t-1} + b_c) \\ C_t = f_t \cdot C_{t-1} + i_t \cdot \tilde{C}_t \\ o_t = sigmoid(W_o \cdot r_{w_t}^{lstm} + U_o \cdot h_{t-1} + b_o) \\ h_t = o_t \cdot \tanh(C_t) \\ r_{w_t}^{short} = \vec{h_t} \| \overleftarrow{h_t} \end{cases}$$

In the above formula, $r_{W_t}^{lstm}$ refers to a representation input of the t-th word, and i, o and f refer to an input gate, an output gate and a forget gate in the BiLSTM, respectively; $\tilde{C}$ and C refer to a retained total memory and a memory retained for the current word, respectively. h refers to a word representation with a memory in a particular direction where its dimension is H, and $\vec{h}$ 和 $\overleftarrow{h}$ refer to forward and backward word representations with memories, respectively. $W \in \overleftarrow{h}^{H \times D}, U \in \overleftarrow{h}^{H \times H}$ and $b \in \overleftarrow{h}^{H \times 1}$ are all network parameters, where $W_f$, $U_f$, $b_f$ are network parameters of the forget gate, $W_i$, $U_i$ and $b_i$ are network parameters of the input gate, $W_o$, $U_o$ and $b_o$ are network parameters of the output gate, and $W_C$, $U_C$ and $b_C$ are network parameters of the retained total memory. sigmoid and tanh are both common activation functions in a neural network. A final word representation $r_{W_t}^{short}$ of each word in the short sentence is obtained by splicing the word representations in two directions, where the BiLSTM-based vector representations of all words in the sentence s constitute a sentence matrix representations $R_s^{short}$ containing contextual information as follows:

$$R_s^{short} = (r_{W_1}^{short} r_{W_2}^{short} \ldots r_{W_L}^{short}).$$

Optionally, at block C, when the sentence length L is greater than the threshold $L_{threshold}$, a corresponding output of the BiLSTM-based feature extractor is an all-zero matrix, which is equivalent to performing feature extraction by only adopting the Transformer-based feature extractor. The feature extraction is performed for the sentence based on the following calculation formula:

$$\begin{cases} f(R_s^{tsfm})_{a_i} = O_{a_i}^T \cdot \tanh(W_{a_i} \cdot R_s^{tsfm} + U_{a_i} \cdot R_s^{tsfm}) \\ R_s^{a_i} = R_s^{tsfm} \cdot softmax\left(\frac{f(R_s^{tsfm})_{a_i}^T}{\sqrt{d_{R_s^{tsfm}}}}\right) \\ R_s^{long} = R_s^{a_1} \| R_s^{a_2} \| \ldots \| R_s^{a_n} = \left(r_{w_1}^{long} r_{w_2}^{long} \ldots r_{w_L}^{long}\right) \end{cases}$$

In the above formula, $f(R_s^{tsfm})_{a_i}$ refers to a self-attention similarity of the i-th self-attention mechanism in a multi-head self-attention mechanism of a Transformer neural network; $R_s^{a_i}$ refers to a sentence matrix representation effected by the i-th self-attention, O, W and U are self-attention parameters; $d_{R_s}^{tsfm}$ refers to a dimension of each word vector in the input sentence matrix representation, $\sqrt{d_{R_s}^{tsfm}}$ aims to compress a softmax function, and $R_s^{long}$ refers to a Transformer-based sentence matrix representation containing contextual information.

Optionally, at block D, a comprehensive matrix representation of question and answer sentences is obtained by performing learning based on interaction information between the question and the answer by the attention pooling layer. The final distributed vector representation of the question sentence and the answer sentence is obtained by extracting the maximum feature at each dimension of row and column in the similarity matrix, respectively. A specific operation formula used by the attention pooling layer to perform sentence matrix representations $R_Q$ and $R_A$ for the question and the answer is as follows:

$$\begin{cases} G = R_Q^T \cdot U \cdot R_A \\ v_q = R_Q \cdot softmax(ColumnMax(G)) \\ v_a = R_A \cdot softmax(RowMax(G)) \end{cases}$$

In the above formula, G refers to an attention similarity of the question and the answer, $R_Q$ refers to a sentence matrix representation containing contextual information for the question sentence, $R_Q^T$ refers to a transposition of $R_Q$, $R_A$ refers to a sentence matrix representation containing contextual information for the answer sentence, and U is an attention parameter;ColumnMax(*)and RowMax(*) are functions of taking maximum values of each column and each row of the matrix, respectively.

Optionally, at block E, the neural network is trained by minimizing a sorting loss of the following candidate answers so that the neural network reaches an optimal training stage as follows:

$$loss = \max\{0, m - \cos(v_q, v_a+) + \cos(v_q, v_a-)\}$$

In the training stage, each training instance includes one question q, one positive answer $a^+$ (a correct answer) and one negative answer $a^-$ (a wrong answer), where the wrong answer is randomly extracted from all answers in a training set, m is one preset internal for determining whether a particular training instance is to be terminated, $v_q$ refers to a distributed vector representation of the question sentence, $v_a$ refers to a distributed vector representation of the answer sentence, $a^+$ refers to the positive answer in the training instance, and $a^-$ refers to the negative answer in the training instance. In the method of the present disclosure, the candidate answers may be sorted according to the correlation of each question and the corresponding answer.

Figure 3:
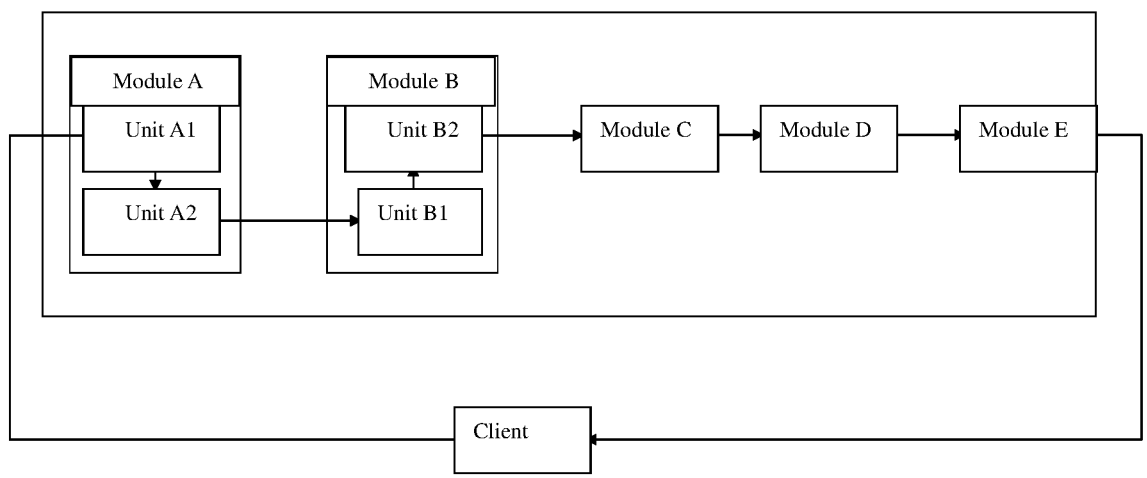
FIG. 3 is a schematic diagram of a question answering system including a client and a server, wherein the client is connected with the server through a wireless network.

Based on the above method, the present disclosure further provides an answer selection system for a question answering system. As shown in FIG. 3, the system includes a client and a server, and the client is connected with the server through a wireless network.

The server includes the following modules.

In module A, a question sentence and an answer sentence input by a user are received, a first word vector of each word in each sentence is obtained by using a word embedding model obtained through pre-training, and a combined word vector is obtained through calculation in combination with a second word vector obtained by performing fine adjustment for the word embedding model in a network training process.

In module B, a final vector of each word in the sentence is obtained by selecting a valid feature from the connected word vectors.

In module C, when a sentence length is greater or smaller than a preset sentence length threshold, the sentence is processed by adopting a different feature extractor according to the preset sentence length threshold to generate a fitted sentence matrix representation containing contextual information.

In module D, an attention similarity of the question sentence and the answer sentence is obtained by an attention pooling layer according to the sentence matrix containing contextual information obtained at block C, and a length-adaptive distributed representation is performed for the question sentence and the answer sentence by respectively extracting a maximum feature at each dimension of row and column of a similarity matrix, respectively, so as to generate a distributed vector representation for the question sentence and the answer sentence, respectively.

In module E, a correlation of each answer sentence relative to the question sentence is obtained by measuring a cosine similarity between the distributed vector representations of the question sentence and the answer sentence, and the answer sentences are sorted according to the correlation.

Module A includes the following units.

In unit A1, the input question sentence and the input answer sentence are both defined as a sentence s with a length being L, and a word embedding model of the t-th word $W_t$ in the sentence s is obtained through pre-training in a corpus to search for a first word vector $r_{W_t}^{fr}$.

In unit A2, fine adjustment is performed for parameters of the pre-trained word embedding model in the network training process to adapt the model to a current data set, the updated word embedding model is obtained, and a second word vector $r_{W_t}^{ft}$ corresponding to the word is obtained therefrom to calculate a combined word vector as $r_{W_t}^C = r_{W_t}^{fr} \| r_{W_t}^{ft}$.

Module B includes the following units.

In unit B1, a hidden layer is deployed and a final vector representation of each word in the sentence is obtained by selecting a valid feature from the connected word vectors based on $$r_{W_t} = \tanh(W_h \cdot r_{W_t}^C + b_h).$$

In the above formula, h refers to a word representation with a memory in a particular direction, $W_h \in \mathbb{R}^{D \times D}$ and $\in \mathbb{R}^{D \times 1}$ both refer to hidden layer parameters, $\mathbb{R}$ refers to a set of real numbers, $\mathbb{R}^{D \times D}$ refers to a real number matrix with dimensions being D×D, $\mathbb{R}^{D \times 1}$ refers to a real number matrix with dimensions being D×1, and D refers to a dimension of $r_{W_t}$.

In unit B2, a sentence distributed matrix representation containing no contextual information is obtained based on $R_s = (r_{W_1} r_{W_2} \ldots r_{W_L})$ by performing blocks A1, A2 and B1 for all words in all sentences.

To verify the validity of the method, answer selection is performed for question-answer pairs with different lengths, that is, a short question plus a long correct answer (short-long) and a long question plus a long correct answer (long-long) through QA-CNN, QA-BiLSTM, AB-LSTM/CNN and an answer selection model based on a length-adaptive neural network (LaNN) of the present method, respectively by using a WikiQA data set published in 2015. Since all correct answers in the WikiQA are long, no short-short and long-short types of question-answer pairs exist.

Statistical data of the WikiQA data set is as shown in Table 1.

TABLE 1

| Variables | Training | Validation | Test | Overall |
|---|---|---|---|---|
| # Questions | 873 | 126 | 243 | 1,242 |
| # Correct Answers | 1,040 | 140 | 293 | 1,473 |
| QA Pairs | 8,672 | 1,130 | 2,351 | 12,153 |
| Avg. len. Of ques. | 6.36 | 6.72 | 6.46 | 6.42 |
| Avg. len. Of answ. | 25.51 | 24.59 | 25.02 | 25.33 |

The length threshold in the experiment is set to 5 (different thresholds were tested in preliminary experiments and an optimal performance value was observed when the threshold is 5). The threshold is approximate to an average length of a question. A pre-trained word embedding and a hidden layer are set to 300 in size. Lengths of all question and answer sentences are padded to 40. A sorting loss is optimized by adopting an adaptive moment estimation (Adam) optimization function. The model is trained by a small-batch method, and a learning rate of each round of training is changed by using exponential decay. In addition, an L2 regularization method and a Dropout regularization method are also used in the training process to avoid an overfitting problem. Table 2 specifically describes main parameters of the model in the present method.

TABLE 2

| Model | Bs | Mg | Dp | Lr | L2 | Hn | Hs | Rs | Dr |
|---|---|---|---|---|---|---|---|---|---|
| LaNN | 30 | 0.1 | 0.5 | $10^{-4}$ | $10^{-3}$ | 7 | 40 | 280 | 0.85 |

To verify whether the performance of the LaNN model proposed in the present method is better than the performance of an existing answer selection baseline model, results of threes baselines and the LaNN model are displayed in the WikiQA test set. In addition, considering the model performance of different types of questions, the test set is divided into 5 groups, that is, how, what, who, where and when. Detailed evaluation scores of MAP and MRR are shown in Table 3.

Generally, the QA-BiLSTM model is better than the QA-CNN model in both evaluation indexes since the BiLSTM can extract sequence features in text data better than the CNN. In addition, the AB-LSTM/CNN model shows a performance improvement compared with other two baseline models without integrating an attention mechanism. Compared with the baseline model, the present method achieves the highest performance in MAP and MRR. Particularly the model of the present method is better than a typical RNN-based QA-BiLSTM model in MAP and MRR, achieving the performance improvement up to 2.74% and 3.45%, respectively. The Transformer-based feature extractor in the model of the present method may help to solve the long-term dependency problem in the long sentence. In addition, compared with the optimal baseline model AB-LSTM/CNN, the overall MAP and MRR scores of the model of the present method increase by 1.67% and 2.06%, respectively, which indicates that the method of performing distributed representations for sentences by different feature extractors facilitates improving the performance of answer selection.

For different types of questions, the method performs better than three baseline models in all types of questions except for the question type "how". The baseline model QA-BiLSTM with a BiLSTM structure achieves the optimal result since the BiLSTM-based structure is more valid in extracting contextual features hidden in sequence data than a CNN structure and a Transformer structure, which is further highlighted when the "how" type question is answered. The model of the present method achieves the highest improvement in the "who" type question, and increases performances by 5.87% and 5.95% in MAP and MRR, respectively compared with the optimal baseline AB-LSTM/CNN. The Transformer-based structure used in the model of the present method may process the long-term dependency relationship to some extent, and can well extract features in a long-distance word hidden in the correct answer when the "who" type question is answered.

Compared with the baseline model, the model of the present method has obvious improvements in MAP and MRR of the short-long group with small improvements in the long-long group. For example, in the short-long group, the model of the present method increases performances by 7.34% and 8.99% in MAP and MRR, respectively compared with the optimal baseline AB-LSTM/CNN; in the long-long group, the model of the present method only increases performances by 0.74% and 0.97% in MAP and MRR, respectively. Therefore, the model of the present method facilitates improving the performance of answer selection, particularly in the question-answer pairs with short questions and long correct answers. That is, the Transformer-based feature extractor is beneficial to the long correct answers. However, when the long correct answers are processed, short questions are more beneficial than long questions. Impacts of length differences between questions and

TABLE 3

| Models | MAP | | | | | | MER | | | | | |
|---|---|---|---|---|---|---|---|---|---|---|---|---|
| | overall | how | what | who | where | when | overall | how | what | who | where | when |
| QA-CNN | 0.6613 | 0.5837 | 0.6887 | 0.6439 | 0.6645 | 0.6169 | 0.6732 | 0.5919 | 0.7044 | 0.6493 | 0.6932 | 0.6221 |
| QA-BiLSIM | 0.6709 | 0.6061 | 0.6812 | 0.7426 | 0.7121 | 0.5259 | 0.6790 | 0.6115 | 0.6945 | 0.7450 | 0.7080 | 0.5259 |
| AB-LSTM/CNN | 0.6780 | 0.5764 | 0.6875 | 0.7561 | 0.7255 | 0.6008 | 0.6882 | 0.5802 | 0.7003 | 0.7629 | 0.7376 | 0.6094 |
| LaNN | 0.6893 | 0.5621 | 0.6933 | 0.8005 | 0.7576 | 0.6196 | 0.7024 | 0.5721 | 0.7083 | 0.8083 | 0.7761 | 0.6273 | answers are further analyzed to obtain a conclusion that the method performs better for longer answers and shorter questions.

Persons of ordinary skill in the art may understand that discussion of any of the above examples is merely exemplary, and is not intended to imply that the scope of the present disclosure (including claims) is limited to these examples. Based on the spirit of the present disclosure, technical features in the above examples or different examples may also be combined, blocks may be implemented in any order, and there may be many other changes in different aspects of the present disclosure as described above, which are not provided in details for brevity.

The examples of the present disclosure aim to include all substitutions, modifications and changes falling into the broad scope of the appended claims. Therefore, any omissions, modifications, equivalent substitutions, improvements and the like made within the spirit and principles of the present disclosure shall be encompassed in the scope of protection of the present disclosure.

The foregoing description of the exemplary embodiments of the present invention has been presented only for the purposes of illustration and description and is not intended to be exhaustive or to limit the invention to the precise forms disclosed. Many modifications and variations are possible in light of the above teaching.

The embodiments were chosen and described in order to explain the principles of the invention and their practical application so as to activate others skilled in the art to utilize the invention and various embodiments and with various modifications as are suited to the particular use contemplated. Alternative embodiments will become apparent to those skilled in the art to which the present invention pertains without departing from its spirit and scope. Accordingly, the scope of the present invention is defined by the appended claims rather than the foregoing description and the exemplary embodiments described therein.

What is claimed is:

1. An answer selection method for a question answering system, comprising the following blocks:
    at block A, receiving a question sentence and an answer sentence input by a user, and obtaining a first word vector of each word in each sentence by using a word embedding model obtained through pre-training to calculate a combined word vector in combination with a second word vector obtained by performing fine adjustment for the word embedding model in a network training process;
    at block B, obtaining a final vector of each word in the sentence by selecting a valid feature from the connected word vectors;
    at block C, when a sentence length is greater or smaller than a preset sentence length threshold, processing the sentence by adopting a different feature extractor according to the preset sentence length threshold to generate a fitted sentence matrix representation containing contextual information;
    at block D, obtaining, by an attention pooling layer, an attention similarity of the question sentence and the answer sentence according to the sentence matrix containing contextual information obtained at block C, and performing a length-adaptive distributed representation for the question sentence and the answer sentence by extracting a maximum feature at each dimension of row and column of a similarity matrix respectively to generate a distributed vector representation for the question sentence and the answer sentence respectively; and
    at block E, obtaining a correlation of each answer sentence relative to the question sentence by measuring a cosine similarity between the distributed vector representations of the question sentence and the answer sentence, and sorting the answer sentences according to the correlation.

2. The answer selection method according to claim 1, wherein block A comprises the following blocks:
    at block A1, defining the input question sentence and the input answer sentence both as a sentence s with a length being L, obtaining a word embedding model of the t-th word $W_t$ in the sentence s through pre-training in a corpus, and searching for a first word vector $r_{W_t}^{fr}$ corresponding to the word therefrom; and
    at block A2, performing fine adjustment for parameters of the pre-trained word embedding model in the network training process to adapt the model to a current data set, obtaining the updated word embedding model, and obtaining a second word vector $r_{W_t}^{ft}$ corresponding to the word therefrom to calculate a combined word vector as $r_{W_t}^{C} = r_{W_t}^{fr} \| r_{W_t}^{ft}$.

3. The answer selection method according to claim 2, wherein block B comprises the following blocks:
    at block B1, deploying a hidden layer, and obtaining a final vector representation of each word in the sentence by selecting a valid feature from the connected word vectors based on $$r_{W_t} = \tanh(W_h \cdot r_{W_t}^{C} + b_h),$$

wherein h refers to a word representation with a memory in a particular direction, $W_h \in \mathbb{R}^{D \times D}$ and $b_h \in \mathbb{R}^{D \times 1}$ both refer to hidden layer parameters, $\mathbb{R}$ refers to a set of real numbers, $\mathbb{R}^{D \times D}$ refers to a real number matrix with dimensions being D×D, $\mathbb{R}^{D \times 1}$ refers to a real number matrix with dimensions being D×1, and D refers to a dimension of $r_{W_t}$; and
    at block B2, obtaining a sentence distributed matrix representation containing no contextual information based on $R_s = (r_{W_1} r_{W_2} \ldots r_{W_L})$ by performing blocks A1, A2 and B1 for all words in all sentences.

4. The answer selection method according to claim 1, wherein at block C, two feature extractors, i.e., a BiLSTM-based feature extractor and a Transformer-based feature extractor, are deployed for each input sentence, and a fitted sentence distributed matrix representation is generated by performing addition for the sentence distributed matrixes generated with two feature extractors.

5. The answer selection method according to claim 4, wherein at block C, each feature extractor is defined to have one binary activation parameter, and the binary activation parameters are set as follows:

$$\begin{cases} flag_{lstm} = 1 \text{ and } flag_{tsfm} = 0, & (L \leq L_{threshold}) \\ flag_{lstm} = 0 \text{ and } flag_{tsfm} = 1, & (L > L_{threshold}) \end{cases}$$

wherein $flag_{lstm}$ refers to the binary activation parameter of the BiLSTM-based feature extractor, $flag_{tsfm}$ refers to the binary activation parameter of the Transformer-based feature extractor, and $L_{threshold}$ refers to a sentence length threshold, and
the inputs of different sentences based on the feature extractors are as follows:

$$R_s^{lstm} = R_s \cdot flag_{lstm}$$

$$R_s^{tsfm} = R_s \cdot flag_{tsfm}$$

wherein, $R_s^{lstm}$ refers to an input of the BiLSTM-based feature extractor, and $R_s^{tsfm}$ refers to an input of the Transformer-based feature extractor.

6. The answer selection method according to claim 5, wherein at block C, when the sentence length L is smaller than the threshold $L_{threshold}$, the method further comprises: a specific operation formula for the representation input of the t-th word in the sentence being as follows:

$$\begin{cases} f_t = sigmoid(W_f \cdot r_{w_t}^{lstm} + U_f \cdot h_{t-1} + b_f) \\ i_t = sigmoid(W_i \cdot r_{w_t}^{lstm} + U_i \cdot h_{t-1} + b_i) \\ \tilde{C}_t = \tanh(W_c \cdot r_{w_t}^{lstm} + U_c \cdot h_{t-1} + b_c) \\ C_t = f_t \cdot C_{t-1} + i_t \cdot \tilde{C}_t \\ o_t = sigmoid(W_o \cdot r_{w_t}^{lstm} + U_o \cdot h_{t-1} + b_o) \\ h_t = o_t \cdot \tanh(C_t) \\ r_{w_t}^{short} = \overrightarrow{h_t} \| \overleftarrow{h_t} \end{cases}$$

Wherein $r_{w_t}^{lstm}$ refers to a representation input of the t-th word, i, o and f refer to an input gate, an output gate and a forget gate in the BiLSTM respectively, $\tilde{C}$ and C refer to a retained total memory and a memory retained for the current word respectively, h refers to a word representation with a memory in a particular direction where its dimension is H, $\overrightarrow{h}$ and $\overleftarrow{h}$ refer to forward and backward word representations with memories respectively, $W \in \mathbb{R}^{H \times D}$, $U \in \mathbb{R}^{H \times H}$ and $b \in \mathbb{R}^{H \times 1}$ are all network parameters, $W_f$, $U_f$ and $b_f$ are network parameters of the forget gate, $W_i$, $U_i$ and $b_i$ are network parameters of the input gate, $W_o$, $U_o$ and $b_o$ are network parameters of the output gate, $W_C$, $U_C$ and $b_C$ are network parameters of the retained total memory, and sigmoid and tanh are both common activation functions in a neural network; and obtaining a final word representation $r_{w_t}^{short}$ each word in a short sentence by splicing the word representations in two directions, wherein the BiLSTM-based vector representations constitute a sentence matrix representation $R_s^{short}$ containing contextual information as follows:

$$R_s^{short} = (r_{w_1}^{short} r_{w_2}^{short} \ldots r_{w_L}^{short}).$$

7. The answer selection method according to claim 5, wherein at block C, when the sentence length L is greater than the threshold $L_{threshold}$, feature extraction is performed for the sentence based on the following calculation formula:

$$\begin{cases} f(R_s^{tsfm})_{a_i} = O_{a_i}^T \cdot \tanh(W_{a_i} \cdot R_s^{tsfm} + U_{a_i} \cdot R_s^{tsfm}) \\ R_s^{a_i} = R_s^{tsfm} \cdot softmax\left(\frac{f(R_s^{tsfm})_{a_i}^T}{\sqrt{d_{R_s^{tsfm}}}}\right) \\ R_s^{long} = R_s^{a_1} \| R_s^{a_2} \| \ldots \| R_s^{a_n} = (r_{w_1}^{long} r_{w_2}^{long} \ldots r_{w_L}^{long}) \end{cases}$$

wherein $f(R_s^{tsfm})_{a_i}$ refers to self-attention similarity of the i-th self-attention mechanism in a multi-head self-attention mechanism of a Transformer neural network; $R_s^{a_i}$ refers to a sentence matrix representation effected by the i-th self-attention, O, W and U are self-attention parameters; $d_{R_s^{tsfm}}$ refers to a dimension of each word vector in the input sentence matrix representation, $\sqrt{d_{R_s^{tsfm}}}$ aims to compress a softmax function, and $R_s^{long}$ refers to a Transformer-based sentence matrix representation containing contextual information.

8. The answer selection method according to claim 1, wherein at block D, a specific operation formula used by the attention pooling layer for the question sentence and the answer sentence is as follows:

$$\begin{cases} G = R_Q^T \cdot U \cdot R_A \\ v_q = R_Q \cdot softmax(ColumnMax(G)) \\ v_a = R_A \cdot softmax(RowMax(G)) \end{cases}$$

wherein G refers to an attention similarity of a question and an answer, $R_Q$ refers to a sentence matrix representation containing contextual information for the question sentence, $R_Q^T$ refers to a transposition of $R_Q$, $R_A$ refers to a sentence matrix representation containing contextual information for the answer sentence, and U is an attention parameter; ColumnMax(*) and RowMax(*) are functions of taking maximum values of each column and each row of the matrix respectively.

9. The answer selection method according to claim 1, wherein at block E, the neural network is trained by minimizing a sorting loss of the following candidate answers in such a way that the neural network reaches an optimal training stage:

$$loss = \max\{0, m - \cos(v_q, v_{a+}) + \cos(v_q, v_{a-})\}$$

wherein m is a preset interval, $v_q$ refers to a distributed vector representation of the question sentence, $v_a$ refers to a distributed vector representation of the answer sentence, $a^+$ refers to a positive answer in a training instance, and $a^-$ refers to a negative answer in the training instance.

10. An answer selection system for a question answering system, comprising a client and a server, wherein the client is connected with the server through a wireless network, wherein the server comprises the following modules:

in module A, receiving a question sentence and an answer sentence input by a user, and obtaining a first word vector of each word in each sentence by using a word embedding model obtained through pre-training to calculate a combined word vector in combination with a second word vector obtained by performing fine adjustment for the word embedding model in a network training process;

in module B, obtaining a final vector of each word in the sentence by selecting a valid feature from the connected word vectors;

in module C, when a sentence length is greater or smaller than a preset sentence length threshold, processing the sentence by adopting a different feature extractor according to the preset sentence length threshold to generate a fitted sentence matrix representation containing contextual information;

in module D, obtaining, by an attention pooling layer, an attention similarity of the question sentence and the answer sentence according to the sentence matrix containing contextual information obtained at block C, and performing a length-adaptive distributed representation for the question sentence and the answer sentence by extracting a maximum feature at each dimension of row and column of a similarity matrix respectively to generate a distributed vector representation for the question sentence and the answer sentence respectively; and in module E, obtaining a correlation of each answer sentence relative to the question sentence by measuring a cosine similarity between the distributed vector representations of the question sentence and the answer sentence, and sorting the answer sentences according to the correlation, wherein the module A comprises the following units:

in unit A1, defining the input question sentence and the input answer sentence both as a sentence s with a length being L, obtaining a word embedding model of the t-th word $W_t$ in the sentence s through pre-training in a corpus, and searching for a first word vector $r_{W_t}^{fr}$ corresponding to the word therefrom; and in unit A2, performing fine adjustment for parameters of the pre-trained word embedding model in the network training process to adapt the model to a current data set, obtaining the updated word embedding model, and obtaining a second word vector $r_{W_t}^{ft}$ corresponding to the word therefrom to calculate a combined word vector as $r_{W_t}^{C} = r_{W_t}^{fr} \| r_{W_t}^{ft}$, wherein the module B comprises the following units:

in unit B1, deploying a hidden layer and obtaining a final vector representation of each word in the sentence by selecting a valid feature from the connected word vectors based on $r_{W_t} = \tanh(W_h \cdot r_{W_t}^{C} + b_h)$, wherein h refers to a word representation with a memory in a particular direction, $W_h \in \mathbb{R}^{D \times D}$ and $b_h \in \mathbb{R}^{D \times 1}$ both refer to hidden layer parameters, $\mathbb{R}$ refers to a set of real numbers, $\mathbb{R}^{D \times D}$ refers to a real number matrix with dimensions being D×D, $\mathbb{R}^{D \times 1}$ refers to a real number matrix with dimensions being D×1, and D refers to a dimension of $r_{W_t}$, and in unit B2, obtaining a sentence distributed matrix representation containing no contextual information based on $R_s = (r_{W_1} r_{W_2} \ldots r_{W_L})$ by performing blocks A1, A2 and B1 for all words in all sentences.

* * * * *